Sept. 17, 1968 HISAO KINJO 3,402,256

FM VIDEO RECORDING WITH WHITE LEVEL CLAMPING

Filed March 31, 1965 3 Sheets-Sheet 1

INVENTOR
HISAO KINJO
BY Louis Bernat
ATTORNEY

INVENTOR
HISAO KINJO
BY Louis Bernat
ATTORNEY

INVENTOR
HISAO KINJO
BY Louis Bernat
ATTORNEY

United States Patent Office 3,402,256

Patented Sept. 17, 1968

3,402,256

FM VIDEO RECORDING WITH WHITE LEVEL CLAMPING

Hisao Kinjo Yokohama, Japan, asssignor to Victor Company of Japan, Limited, Yokohama, Japan, a corporation of Japan Filed Mar. 31, 1965, Ser. No. 444,227
Claims priority, application Japan, Apr. 1, 1964, 39/18,217
11 Claims. (Cl. 178—6.6)

The present invention is related to systems for translating a video signal and more particularly to systems for magnetically recording and reproducing a video signal such as television video signals or the like, and has as its main object the provision of a novel system for magnetically recording and reproducing a video signal wherein the video signal is recorded on a magnetic record medium and the recorded video signal is reproduced from the record medium in an excellent manner.

Another object of the invention is to provide a novel system for magnetically recording and reproducing a video signal wherein the video signal is recorded on a magnetic record medium and the recorded video signal is reproduced from the record medium in an excellent manner without including any interfering component such as noise, hum components or the like.

A further object of the invention is to provide a novel system for magnetically recording and reproducing a television video signal adapted to fix the white peaks of the television video signal to be recorded to a constant level and enabling the magnetic recording and reproduction of the video signal to be obtained without including any noise or hum components and without overmodulation.

Another object of the invention is to provide a novel system for magnetically recording and reproducing a television video signal in which interference due to beat signal components is obviated.

Another object of the invention is to provide a novel system for magnetically recording and reproducing a television video signal which requires no white level clipper.

According to this invention, a video signal translating system is provided wherein a frequency modulated carrier signal is produced which varies in frequency between two limits respectively corresponding to a first amplitude limit of a video signal defined by synchronizing pulses and a second limit of the video signal corresponding to maximum video information, and wherein level fixing means are provided for fixing the frequency of the modulated carrier during intervals when the amplitude of the video signal is at the second limit thereof. The frequency modulated signal so produced is applied to a signal transmission channel to be subsequently demodulated for reproduction of the original video signal, and it is found that interference components such as noise, hum components and the like are substantially eliminated, and overmodulation is not produced.

The arrangement is particularly advantageous when applied to a system in which the signal transmission channel can transmit only a limited frequency band, such as a system including magnetic recording and reproducing means, in that it insures that the frequencies of the carrier which correspond to video information will fall within the band, while any frequencies produced outside the band will correspond to the synchronizing pulses which are readily reproduced even with the loss of such frequencies. Thus the most important part of the signal, that corresponding to the video information, is translated with high fidelity and without production of interference components.

The arrangement is especially advantageous when applied to a system wherein the lower frequency limit of the frequency modulated carrier signal is less than the maximum frequency of the input signal frequency range. In such a system, signals can be translated with high fidelity and without requiring increased band width requirements, but it is found to be important that the levels be fixed in a manner as is made possible by the arrangement of this invention.

A specific feature of the invention is in the provision of a comparatively simple but highly effective circuit for accomplishing the required level-fixing operation.

Another specific feature of the invention is in the provision of a modulator circuit which is readily controlled from the level-fixing circuit, with a direct connection between the circuits.

These and other objects, features and advantages of the invention will be evident from the following description of the invention. Reference is made to the accompanying drawings, in which, FIG. 1 is a block diagram showing a recording section of a system embodying the invention;

FIGS. 2(A) to 2(F) are wave forms explaining the operation of the recording section shown in FIG. 1;

FIG. 3 is a block diagram showing a reproducing section of the system embodying the invention;

FIGS. 4(A) to 4(D) are wave forms explaining the operation of the reproducing section shown in FIG. 3;

Figure 1:
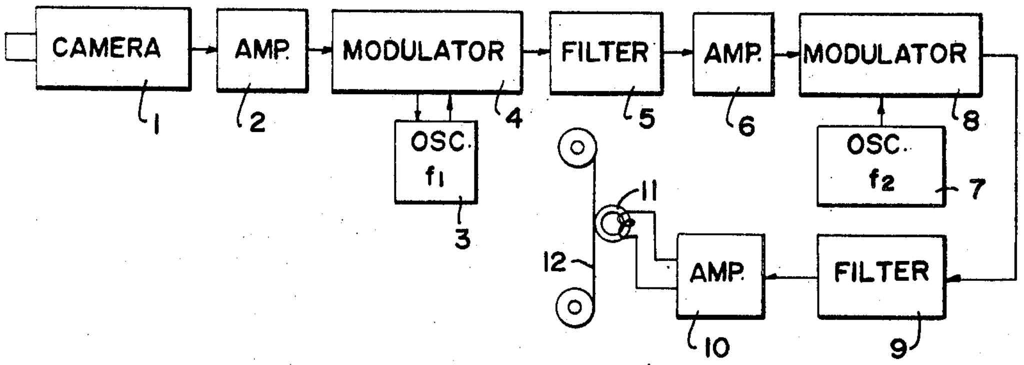

FIG. 1 shows a recording section of a system for magnetically recording and reproducing a television video signal embodying the invention, in which 1 designates a television camera, 2 a video amplifier, 3 a first local oscillator oscillating at a frequency $f_1$, 4 a first frequency modulator, 5 a first filter, 6 an amplifier, 7 a second local oscillator oscillating at a frequency $f_2$, 8 a second modulator or mixer, 9 a second filter, 10 an amplifier, 11 a recording magnetic head, and 12 a magnetic record tape.

Figure 2:
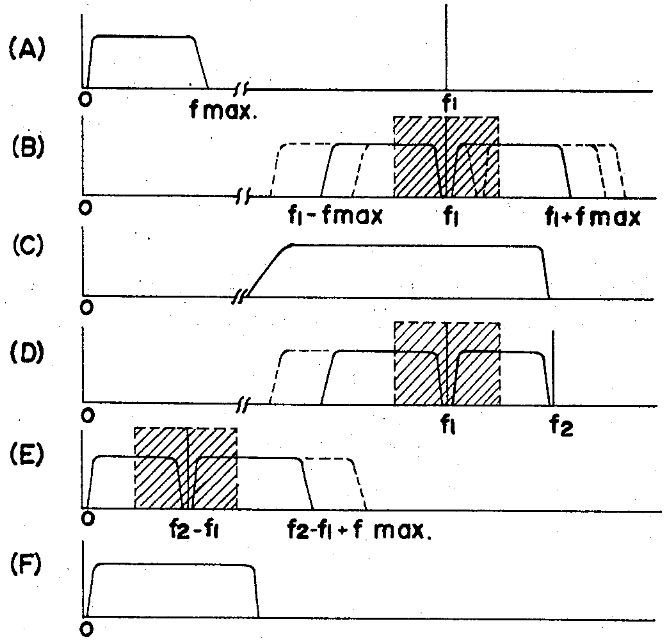

The operation of the system shown in FIG. 1 is as follows:

The frequency band or spectrum of a video signal produced by the television camera 1 and having a maximum frequency $f_{max}$ is illustrated graphically in FIG. 2(A). The video signal so produced is applied through the amplifier 2 to the modulator 4 to produce a frequency modulated signal having a frequency spectrum as illustrated in FIG. 2(B), with a mean or center frequency $f_1$. The spectrum of main frequency components is illustrated in full lines and the spectrum of additional lower and higher frequency components is indicated in dotted lines. The range of deviation of the carrier from a lower frequency limit $f_1-f_{max}$ to a higher frequency limit $f_1$ plus $f_{max}$ is shown with dotted lines and hatching. The frequency modulated signal is applied to the filter 5 having a band pass characteristic as shown in FIG. 2(C), to produce a signal having a spectrum as shown in FIG. 2(D). This signal is applied to the modulator or mixer 8 to be heterodyned with a signal from the second local oscillator 7, having a frequency $f_2$, to produce a signal having a lower frequency spectrum as shown in FIGURE 2(E). This signal is applied through the filter 9 and through the amplifier 10 to the recording head 11 to be recorded on the tape 12. The overall frequency response characteristic of the filter 9, amplifier 10 and recording and reproducing heads is shown in FIG. 2(F).

In the system as described and shown, $f_2$ is greater than $f_1$ and the filter 5 removes higher frequency components of the signal from the modulator 4 to prevent generation of undesired components at the output of the modulator or mixer 8. The system may also be operated with $f_2$ less than $f_1$ in which case the band pass of the filter 5 should be such that lower frequency components of the signal from the modulator 4 are removed.

Figure 3:
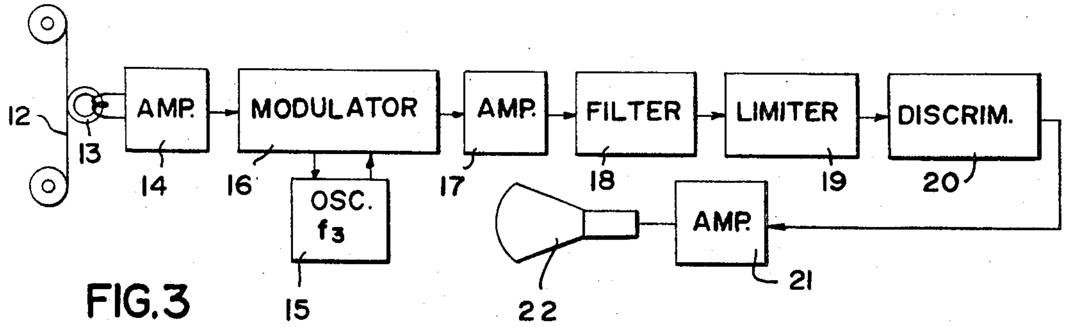
Figure 4:
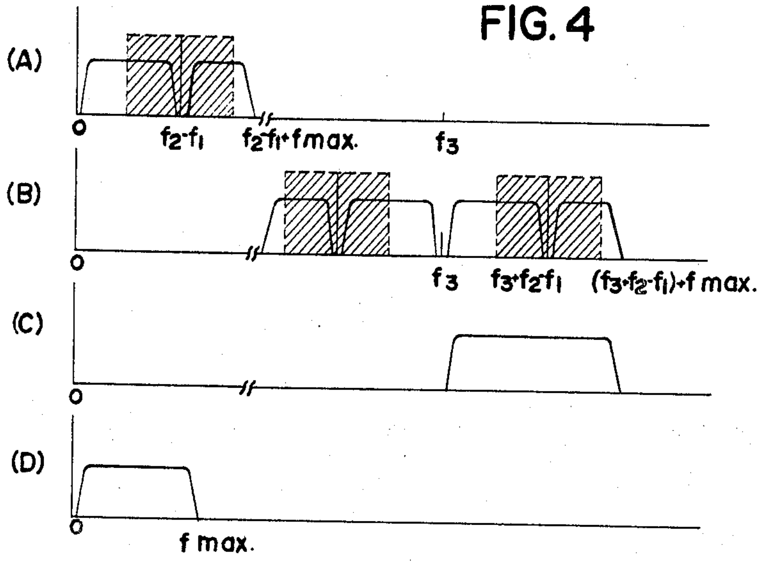

The signal recorded on the magnetic record tape 12 may be reproduced by the system shown in FIG. 3 wherein 12 designates a magnetic record tape, 13 a reproducing magnetic head, 14 an amplifier, 15 a local oscillator oscillating at a frequency $f_3$, 16 a modulator or mixer, 17 an amplifier, 18 a filter, 19 a limiter, 20 a discriminator, 21 a video amplifier and 22 a picture tube. The operation of the system shown in FIG. 3 is as follows:

The reproducing magnetic head 13 serves to pick-up a signal having a spectrum as shown in FIG. 4(A) from the magnetic record 12. This signal is applied through the amplifier 14 to the mixer 16 to be there heterodyned with a signal from local oscillator 15, having a frequency $f_3$, to thereby produce a higher frequency signal having a spectrum as shown in FIG. 4(B). Preferably, the modulator or mixer 16 is of a type which suppresses the carrier signal. One side band of the signal thus obtained, for example the upper side band thereof, is filtered by the filter 18 having a characteristic as shown in FIG. 4(C) to obtain a reproduced signal having a spectrum as shown in FIG. 4(D).

Tle local oscillators used in the recording and reproducing sections may preferably be crystal oscillators which oscillate at substantially fixed frequencies.

One example of the system for magnetically recording and reproducing a video signal embodying the invention has been described above. The frequency modulator means constituting the main feature of the above mentioned system will now be explained in detail.

Figure 5:
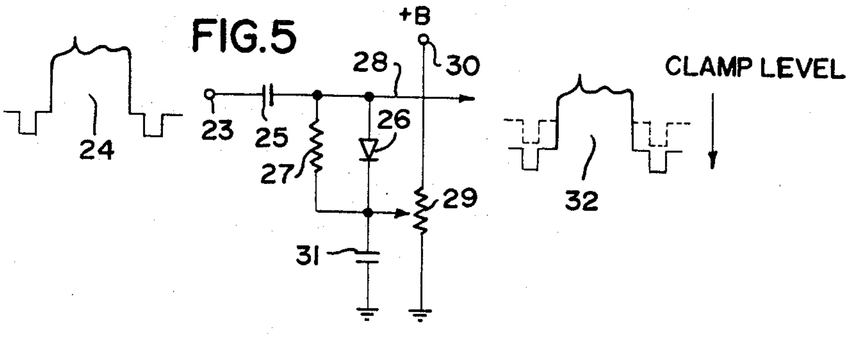
FIG. 5 shows a level-fixing circuit for a modulator means, constituting an important feature of the system embodying the invention, and also shows input and output video signal wave forms for explanation purposes.
Figure 6:
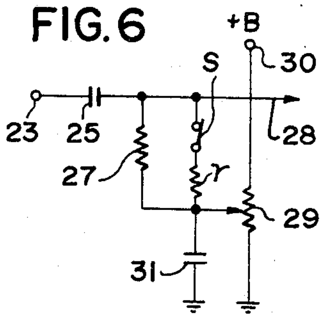
FIG. 6 is an equivalent circuit of the level-fixing circuit shown in FIG. 5.

A level-fixing circuit for explaining the principle of the frequency modulator means is shown in FIG. 5 and an equivalent circuit thereof is shown in FIG. 6.

In the level-fixing circuit shown in FIG. 5, when a television video signal 24, illustrated graphically in FIG. 5, is supplied to a terminal 23, a diode 26 becomes conductive at the highest or peak pulse component of the white level of said signal. In effect, a switch S becomes closed as shown in the equivalent circuit of FIG. 6. This video signal operates to charge a coupling capacitor 25 through the internal resistance of the diode 26 which is represented by resistor $r$ in the equivalent circuit shown in FIG. 6. The internal resistance $r$ of the diode 26 is relatively low so that the time constant RC of the charging circuit is relatively low.

In the time interval following application of a highest or peak pulse component of the white level of a video signal, the diode 26 is not conductive and in effect the switch S of the equivalent circuit of FIG. 6 is kept open, until another highest or peak pulse component arrives. During time intervals of non-conduction of the diode 26, the capacitor 25 can discharge only through the resistor 27 which has a relatively large value, so that the time constant RC of the combination of the resistor 27 and the capacitor 25 is relatively large. When another highest or peak pulse component then arrives, the diode 26 will again conduct and the capacitor will be charged again to a value corresponding to the peak of the white level.

When the diode 26 conducts during the application of the highest or peak components of the white level of the video signal, the voltage drop across the diode 26 is very low so that the potential of the upper terminal of the diode 26, which is connected to an output line 28, is substantially equal to that of the lower terminal thereof, which is connected to a fixed potential point. As illustrated, the lower terminal of the diode is connected to the movable contact of a potentiometer 29 connected between ground and a B-plus terminal 30 and also through a by-pass capacitor 31 to ground. Accordingly, a video signal 32 as illustrated graphically in FIG. 5 has the white peak thereof clamped at a constant level at the output. With a video signal of lower amplitude, the level of the synchronizing pulse portions thereof is moved in a positive direction, as illustrated in dotted lines in FIG. 5, but the white peak level remains fixed.

Figure 7:
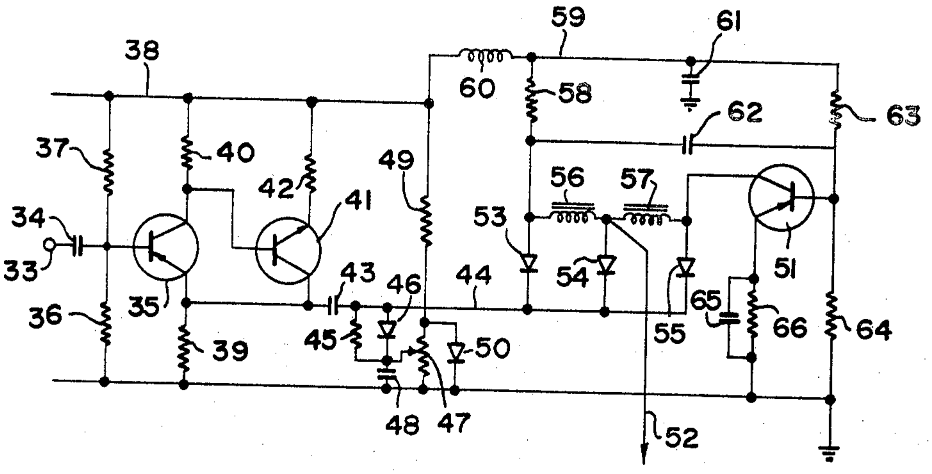
FIG. 7 is a detailed circuit for a modulator means using the level-fixing circuit shown in FIG. 5.

FIG. 7 is a detailed circuit diagram of a frequency modulator circuit designed for use as the frequency modulator 4 of the recording section of the system shown in FIG. 1.

In this circuit, an input terminal 33 is connected through a coupling capacitor 34 to the base of a transistor 35 which is connected through a resistor 36 to ground and through a resistor 37 to a DC power supply line 38. The emitter of the transistor 35 is connected through a resistor 39 to ground while the collector thereof is connected through a resistor 40 to the line 38. A second transistor 41, of a type opposite the transistor 35, has base and collector electrodes respectively connected to the collector and emitter electrodes of the transistor 35 and has an emitter electrode connected through a resistor 42 to the line 38.

Transistors 35 and 41 function to provide a source which has a low output impedance and which develops a video signal corresponding to the video signal applied to the input terminal 33, which may be applied from the amplifier 2 shown in FIG. 1. The video signal so developed is applied to a level-fixing circuit which is like that shown in FIG. 5.

In particular, the video signal from transistors 35 and 41 is applied through a capacitor 43 to a line 44 which is connected through a resistor 45 and a diode 46 to the movable contact of a potentiometer 47, a by-pass capacitor 48 being connected between the movable contact of potentiometer 47 and ground. Potentiometer 47 has its lower end connected to ground and its upper end connected through a resistor 49 to the line 38. A Zener diode 50 is connected in parallel with the potentiometer 47 to regulate the voltage thereacross.

This circuit operates in the same manner as the circuit of FIG. 5. Diode 46 conducts at the highest or peak pulse component of the white level of the video signal to then fix the potential of the output line 44 at a value substantially equal to that of the contact of potentiometer 47. The forward resistance of the dode 46 is however high enough to avoid deterioration of the detail of the video signal, while accomplishing such DC restoration. The electric charge accumulated in the capacitor 43 is discharged through the parallel resistance of the resistor 45, through the reverse resistance of the diode 46 and through the reverse resistance of diodes of the modulator circuit to be described. The values of such elements are preferably such that the discharge circuit has a time constant on the order of 250 myriaseconds to thereby maintain a charge on capacitor 43 which is substantially constant from one line interval to the next, while allowing the circuit to respond to a reduction in the white level of the applied video signal.

Accordingly, a video signal is developed on the line 44 with the white level thereof clamped to a substantially constant value, the value being determined by the position of adjustment of the movable contact of potentiometer 47.

The signal developed on line 44 is applied to a variable delay circuit which is coupled in a feedback loop to modulate the frequency of an oscillator which includes a transistor 51, operative to produce a frequency modulated signal on a line 52. In particular, the line 44 is connected to the cathodes of three variable capacitance diodes 53, 54 and 55, with an inductor 56 being connected between the anodes of diodes 53 and 54 and with an inductor 57 being connected between the anodes of diodes 54 and 55, the anode of diode 54 being connected to the output line 52, and the anode of diode 55 being connected to the collector of transistor 51. The anode of diode 53 is connected through a resistor 58 to a line 59 which is connected through an inductor 60 to the line 38 and through a capacitor 61 to ground. The anode of diode 53 is additionally connected through a capacitor 62 to the base of the transistor 51, which is connected through a resistor 63 to the line 59 and through a resistor 64 to ground. The emitter of transistor 51 is connected to ground through a capacitor 65 and a resistor 66.

Capacitor 62, resistors 58 and 63 and capacitor 61, also resistor 64, form a feedback loop and as the potential of the line 44 is varied by the video signal developed thereon, the capacitance of the diodes 53–55 is varied to vary the delay and to vary the frequency of the signal developed on the line 52.

Figure 8:
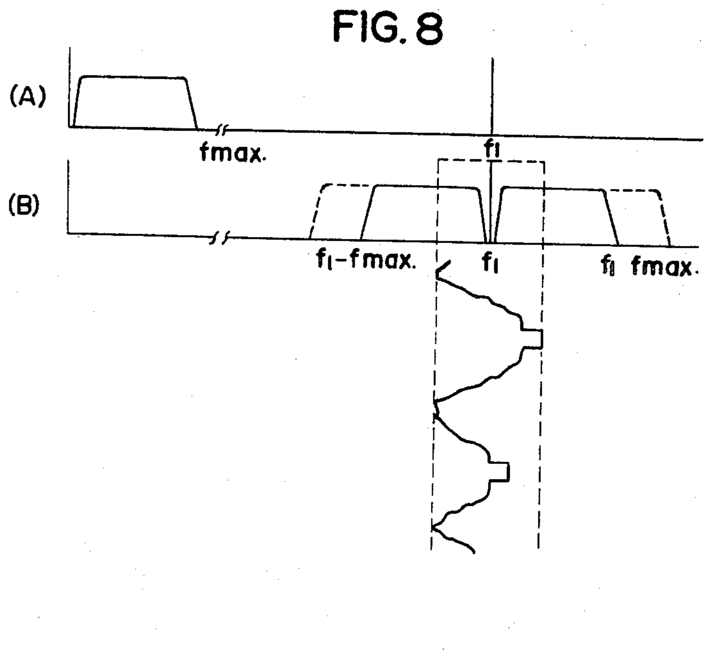
FIGS. 8(A) and 8(B) are wave forms for explaining the operation of the circuit shown in FIG. 7.

FIGURE 8(A) shows the frequency spectrum of a video signal which may be applied to input terminal 33 of the circuit of FIG. 7, having a maximum frequency $f_{max}$ which may be 3.5 megacycles, for example. FIG. 8(B) shows the frequency spectrum of the signal developed on output line 52 and illustrates the relationship thereof to the video signal. It will be noted that the lower limit of the main component of the frequency modulated signal is at a fixed level corresponding to the highest or peak component of the white level of the video signal. When this frequency modulated signal is applied to the filter 5, having a characteristic as shown in FIG. 2(C), a signal having a frequency spectrum as shown in FIG. 2(D) is produced, which is amplified by the amplifier 6 and applied to the modulator or mixer 8 along with the signal at a frequency $f_2$ from the oscillator 7. The frequency $f_2$ may be 51 megacycles, for example. The result is an output signal having a spectrum as shown in FIGURE 2(E). By way of example, the lower limit of the shifted carrier signal frequency may be 2 megacycles, while the upper limit thereof may be 4 megacycles.

It should be noted that the polarity of the video signal shown in FIG. 8(B) may be reversed without affecting the operation, but the highest or peak component of the white should be fixed to establish a corresponding frequency of the frequency modulated signal.

As illustrated in FIG. 8(B), the synchronizing signal component is allowed to shift to the right or to the left in response to changes in the magnitude of the white peak level, but no overmodulation can occur with respect to information components of the video signal, and no beat frequencies are produced. Further, no white level clipper and no compressing action is required so that excellent linearity is obtained. Moreover, with a video signal produced from a picture or scene having a dark background but having bright portions, the system has high resolution capabilities in reproducing detail in the bright portions thereof. Furthermore, carrier leak during reproduction can be decreased with the system.

By way of illustrative example and not by way of limitation, the components in the circuit of FIG. 7 may have the following values:

| Reference numeral: | | Value |
|---|---|---|
| 43 | microfarads | 0.2 |
| 45 | megohm | 1 |
| 47 | ohms | 10,000 |
| 48 | microfarads | 10 |
| 49 | ohms | 560 |
| 58 | do | 220 |
| 60 | microhenries | 20 |
| 61 | microfarads | 0.05 |
| 62 | picofarads | 10 |
| 63 | ohms | 18,000 |
| 64 | do | 4,700 |
| 65 | picofarads | 100 |
| 66 | ohms | 1000 |

If desired an additional capacitor may be provided between line 44 and ground, a capacitor having a value of 50 picofarads being satisfactory.

It will be understood that other modifications and variations may be effected without departing from the spirit and scope of the novel concepts of this invention.

I claim as my invention:

1. In a system for translating a video signal having an amplitude varying between a first limit defined by synchronizing pulses and a second limit corresponding to maximum video information, means responsive to said video signal for producing a frequency modulated carrier signal varying in frequency between two limits respectively corresponding to said first and second amplitude limits, and level fixing means for fixing the level of said video signal during intervals at which said video signal is at said second limit to thereby fix the frequency of said carrier signal at a certain value during said intervals.

2. In a system for translating a video signal having an amplitude varying between a first limit defined by synchronizing pulses and a second limit corresponding to maximum video information and having a frequency range extending to a certain maximum frequency, modulator means responsive to said input signal for producing a first frequency modulated carrier signal having a center frequency substantially higher than said certain maximum frequency, level fixing means for fixing the level of said video signal during intervals at which said video signal is at said second limit to thereby fix the frequency of said first carrier signal at a certain value during said intervals, means for generating a signal at a fixed frequency differing from said center frequency by a frequency less than the sum of said certain maximum frequency and the maximum deviation of said carrier frequency away from said center frequency, and mixer means responsive to said first frequency modulated carrier signal and said fixed frequency signal for producing a second frequency modulated carrier signal varying in frequency between limits corresponding to said amplitude limits of said video signal.

3. In a system for translating a video signal having an amplitude varying between a first limit defined by synchronizing pulses and a second limit corresponding to maximum video information, modulator means including voltage-controlled variable delay circuits and arranged to produce a carrier signal modulated in frequency in accordance with the amplitude of a signal applied to said variable delay circuits, level-fixing means for fixing the level of said video signal during intervals at which said video signal is at said second limit, and means for applying said video signal from said level-fixing means to said voltage-controlled variable delay circuits.

4. In a system for translating a video signal having an amplitude varying between a first limit defined by synchronizing pulses and a second limit corresponding to maximum video information, means responsive to said video signal for producing a frequency modulated carrier signal varying in frequency between two limits respectively corresponding to said first and second amplitude limits, and level fixing means for fixing the level of said video signal during intervals at which said video signal is at said second limit to thereby fix the frequency of said carrier signal at a certain value during said intervals, said level-fixing means comprising an interstage coupling capacitor, and means for fixing the level of charge of said capacitor during said intervals.

5. In a system for translating a video signal having an amplitude varying between a first limit defined by synchronizing pulses and a second limit corresponding to maximum video information, means responsive to said video signal for producing a frequency modulated carrier signal varying in frequency between two limits respectively corresponding to said first and second amplitude limits, and level fixing means for fixing the level of said video signal during intervals at which said video signal is at said second limit to thereby fix the frequency of said carrier signal at a certain value during said intervals, said level fixing means comprising an interstage coupling capacitor, and diode means driven into conduction during said intervals to fix the level of charge of said capacitor.

6. In a system for translating a video signal having an amplitude varying between a first limit defined by synchronizing pulses and a second limit corresponding to maximum video information, means responsive to said video signal for producing a frequency modulated carrier signal varying in frequency between two limits respectively corresponding to said first and second amplitude limits, and level fixing means for fixing the level of said video signal during intervals at which said video signal is at said second limit to thereby fix the frequency of said carrier signal at a certain value during said intervals, said level-fixing means comprising an interstage coupling capacitor, means for charging said capacitor during said intervals to fix the level of charge thereof, and means defining a discharge path for said capacitor with a time constant of the same order of magnitude as the time between said synchronizing pulses.

7. In a system for translating a video signal having an amplitude varying between a first limit defined by synchronizing pulses and a second limit corresponding to maximum video information, modulator means including voltage-controlled variable delay circuits and arranged to produce a carrier signal modulated in frequency in accordance with the amplitude of a signal applied to said variable delay circuits, level-fixing means for fixing the level of said video signal during intervals at which said video signal is at said second limit, and means for applying said video signal from said level-fixing means to said voltage-controlled variable delay circuits, said level-fixing means comprising an interstage coupling capacitor, and means for fixing the level of charge of said capacitor during said intervals, and said variable delay circuits comprising variable capacitance diodes connected to said interstage coupling capacitor.

8. In a system for translating a video signal having an amplitude varying between a first limit defined by synchronizing pulses and a second limit corresponding to maximum video information, means responsive to said video signal for producing a frequency modulated carrier signal varying in frequency between two limits respectively corresponding to said first and second amplitude limits, level fixing means for fixing the level of said video signal during intervals at which said video signal is at said second limit to thereby fix the frequency of said carrier signal at a certain value during said intervals, a signal transmission channel, means for applying said frequency modulated carrier signal to said signal transmission channel, and means including a frequency discriminator for connection to the output of said signal transmission channel for reproducing said input signal.

9. In a method of magnetic recording and reproducing of a video signal having an amplitude varying between a first limit defined by synchronizing pulses and a second limit corresponding to maximum video information, the steps of fixing the level of said video signal during intervals at which said video signal is at said second limit, producing in response to the fixed-level video signal a frequency modulated carrier signal varying in frequency between limits corresponding to said first and second amplitude limits, recording said carrier signal on a magnetic record medium, reproducing said signal from said record medium, and discriminating the reproduced signal to reproduce said video signal.

10. In a system for translating a video signal having an amplitude varying between a first limit defined by synchronizing pulses and a second limit corresponding to maximum video information and having a frequency range extending to a certain maximum frequency, means responsive to said video signal for producing a frequency modulated carrier signal varying in frequency between two limits respectively corresponding to said first and second amplitude limits, level-fixing means for fixing the level of said video signal during intervals at which said video signal is at said second limit to thereby fix the frequency of said carrier signal at a certain value during said intervals, a signal transmission channel, and means for applying said frequency modulator signal to said signal transmission channel, said signal transmission channel having a frequency response characteristic with a manximum frequency at least as high as the upper frequency limit of said carrier signal, the difference between said first and second frequency limits being at least nearly equal to one-half the maximum frequency of said frequency response characteristic.

11. In a system as defined in claim 10, said certain value of the frequency of said carrier signal which is fixed during said intervals being nearly one-half the maximum frequency of said frequency response characteristic.

References Cited

UNITED STATES PATENTS

| | | | |
|---|---|---|---|
| 3,040,125 | 6/1962 | Dillenburger | 178—6.6 |
| 3,288,924 | 11/1966 | Baldwin | 178—6.6 |
| 3,350,504 | 10/1967 | Takayanagi | 178—6.6 |

ROBERT L. GRIFFIN, *Primary Examiner.*

H. W. BRITTON, *Assistant Examiner.*